(12) United States Patent
Song et al.

(10) Patent No.: US 11,066,307 B2
(45) Date of Patent: Jul. 20, 2021

(54) POLYANION ACTIVE MATERIALS AND METHOD OF FORMING THE SAME

(71) Applicant: Toyota Motor Engineering & Manufacturing North America, Inc., Plano, TX (US)

(72) Inventors: Wei Song, Ann Arbor, MI (US); Masaki Matsui, Ann Arbor, MI (US); Toshihiko Tani, Aichi (JP)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 331 days.

(21) Appl. No.: 16/356,786

(22) Filed: Mar. 18, 2019

(65) Prior Publication Data
US 2019/0210884 A1 Jul. 11, 2019

Related U.S. Application Data

(62) Division of application No. 13/191,028, filed on Jul. 26, 2011, now abandoned.

(51) Int. Cl.
*C01B 33/22* (2006.01)
*H01M 4/36* (2006.01)
(Continued)

(52) U.S. Cl.
CPC ............ *C01B 33/22* (2013.01); *H01M 4/366* (2013.01); *H01M 4/5825* (2013.01); *H01M 10/054* (2013.01); *H01M 10/0525* (2013.01)

(58) Field of Classification Search
None
See application file for complete search history.

(56) References Cited

U.S. PATENT DOCUMENTS

| 7,018,603 B2 | 3/2006 | Ritchie et al. |
| 7,338,647 B2 | 3/2008 | Huang et al. |

(Continued)

FOREIGN PATENT DOCUMENTS

| JP | 2009146773 A | 7/2009 |
| JP | 2012048865 A | 3/2012 |

(Continued)

OTHER PUBLICATIONS

Feng et al., "Sol-gel synthesis of Mg1.03Mn0.97SiO4 and its electrochemical intercalation behavior." Journal of Power Sources, 184 (2008) 604-609.

(Continued)

*Primary Examiner* — Alix E Eggerding
(74) *Attorney, Agent, or Firm* — Dinsmore & Shohl LLP

(57) ABSTRACT

A method of forming a polyanion active material that includes providing a carbon source, providing a mobile ion source, providing an active metal material, providing a network material, providing a flux material, and mixing the various materials. In one aspect, the mixing step may include grinding or pulverizing materials to a uniform fine mixture. In one aspect, a ball mill may be utilized to mix the components. Following the mixing of the materials, the mixture is heated to a predetermined temperature in a non-oxidizing atmosphere to form a reaction product. In one aspect, the mixture is heated to a temperature above a melting temperature of the flux material. In this manner, the flux material provides a medium in which the various reactants may react to form the desired reaction product. Following the heating of the mixture the reaction product is washed, forming a carbon coated polyanion active material. Also disclosed is a polyanion active material that includes the in situ reaction product of a carbon source, mobile ion source, active metal material, network material, and a flux (Continued)

SEM-EDS images of the product described in Example 1
(a) SEM image at 27x magnification (b) mapping of Mg, (c) mapping of Mn,
(d) mapping of Si, (e) mapping of O, (f) mapping of C.
(g) SEM image at 20000x magnification material wherein the polyanion active material includes a carbon coating formed thereon.

12 Claims, 2 Drawing Sheets

(51) Int. Cl.
  *H01M 4/58*   (2010.01)
  *H01M 10/0525*   (2010.01)
  *H01M 10/054*   (2010.01)

(56) References Cited

U.S. PATENT DOCUMENTS

| | | |
|---|---|---|
| 2001/0006749 A1 | 7/2001 | Shackle |
| 2008/0303004 A1 | 12/2008 | Mao |
| 2009/0017194 A1 | 1/2009 | Mao et al. |
| 2009/0155689 A1 | 6/2009 | Zaghib et al. |
| 2009/0297952 A1 | 12/2009 | Yasunaga et al. |
| 2009/0305132 A1 | 12/2009 | Gauthier et al. |
| 2010/0181529 A1 | 7/2010 | Huang et al. |
| 2011/0104553 A1 | 5/2011 | Pol et al. |
| 2011/0274850 A1* | 11/2011 | Yang ............... H01M 4/0419 427/453 |
| 2011/0291055 A1 | 12/2011 | Kojima |

FOREIGN PATENT DOCUMENTS

| | | |
|---|---|---|
| WO | 2004001881 A2 | 12/2003 |
| WO | 2007034821 A1 | 3/2007 |
| WO | 2010089931 A1 | 8/2010 |
| WO | 2011019988 A2 | 2/2011 |

OTHER PUBLICATIONS

Yanna NuLi, Jun Yang, Jiulin Wang, and Yun Li, "Electrochemical Intercalation of Mg2+ in Magnesium Manganese Silicate and Its Application as High-Energy Rechargeable Magnesium Battery Cathode", Jun. 22, 2009, American Chemical Society, J. Phys. Chem C 2009, 113, 12594-12597.

* cited by examiner

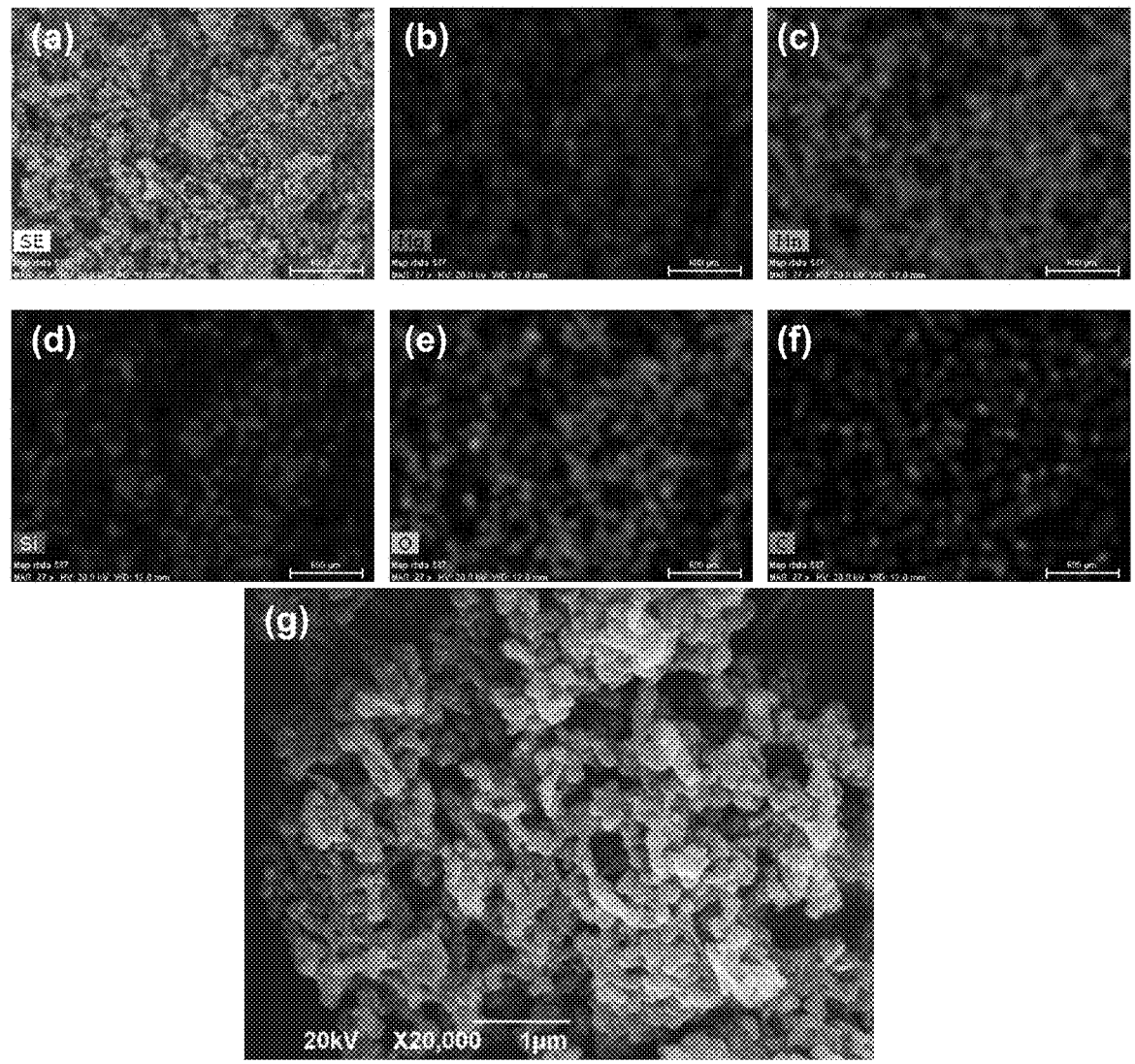
Figure 1: SEM-EDS images of the product described in Example 1
(a) SEM image at 27× magnification (b) mapping of Mg, (c) mapping of Mn,
(d) mapping of Si, (e) mapping of O, (f) mapping of C,
(g) SEM image at 20000× magnification

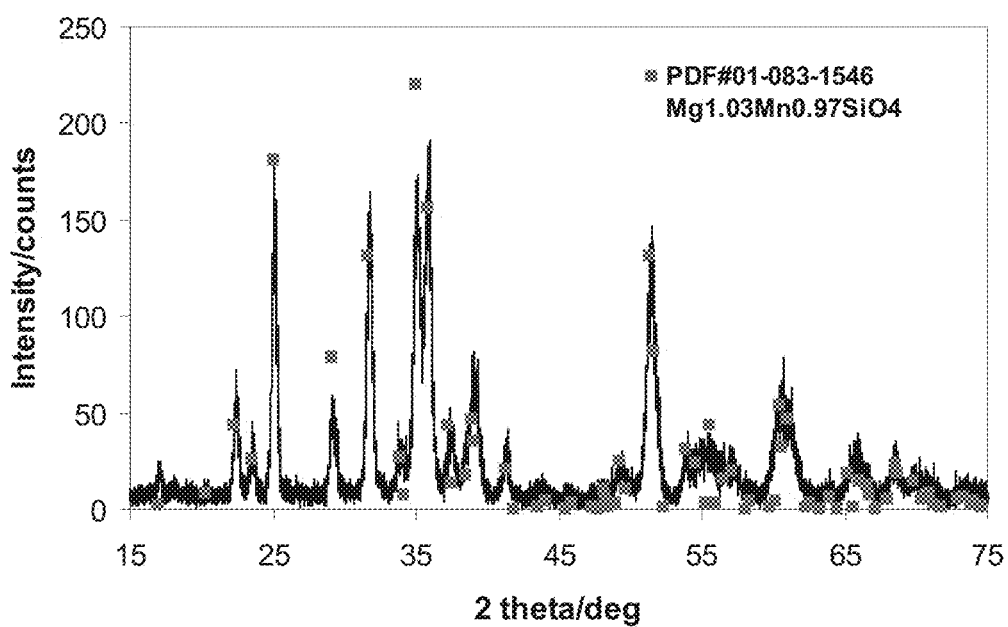
Figure 2: XRD pattern of the product described in Example 1

POLYANION ACTIVE MATERIALS AND METHOD OF FORMING THE SAME

CROSS REFERENCE TO RELATED APPLICATIONS

This application is a Divisional of U.S. application Ser. No. 13/191,028 filed on Jul. 26, 2011.

FIELD OF THE INVENTION

The invention relates to active materials for rechargeable batteries and methods of forming the same.

BACKGROUND OF THE INVENTION

Generally, polyanion based active materials may contain mobile ions and a transition metal within a network. In comparison to metal oxide based materials, polyanion materials may provide active materials that have a higher cell voltage, lower cost, as well as increased stability. However, the electron conductivity of polyanion based materials is low due to the insulating properties of the polyanion based material.

There is therefore a need in the art for a polyanion based active material that has an increased electron conductivity and is easy to manufacture. There is also a need in the art for polyanion active materials that may be manufactured in a cost effective and simple method without the requirement for multiple procedures.

SUMMARY OF THE INVENTION

In one aspect, there is disclosed a method of forming a polyanion active material that includes providing a carbon source; providing a mobile ion source; providing an active metal material; providing a network material; providing a flux material; mixing the carbon source, mobile ion source, active metal material, flux material, and network material; and then heating the mixture to a predetermined temperature in a non-oxidizing atmosphere forming a reaction product, and washing the reaction product forming a carbon coated polyanion active material.

In another aspect, there is disclosed a polyanion active material that includes the in situ reaction product of a carbon source, mobile ion source, active metal material, network material, and a flux material wherein the polyanion active material includes a carbon coating formed thereon.

In a further aspect, there is disclosed a battery that includes an anode, an electrolyte, and a cathode including an active material having the in situ reaction product of a carbon source, mobile ion source, active metal material, network material, and a flux material wherein the polyanion active material includes a carbon coating formed thereon.

BRIEF DESCRIPTION OF THE DRAWINGS

FIG. 1 is a SEM-EDS image of a reaction product of a magnesium manganese silicon oxide having a carbon coating detailed in Example 1; and FIG. 2 is a XRD plot of the material produced in Example 1.

DETAILED DESCRIPTION OF THE PREFERRED EMBODIMENTS

In one aspect, there is disclosed a method of forming a polyanion active material. The polyanion active material may be used in a battery system. In one aspect, the active material may be used as a cathode active material in either lithium or magnesium based battery systems.

There is disclosed a method of forming a polyanion active material that includes providing a carbon source, providing a mobile ion source, providing an active metal material, providing a network material, providing a flux material, and mixing the various materials. In one aspect, the mixing step may include grinding or pulverizing materials to a uniform fine mixture. In one aspect, a ball mill may be utilized to mix the components.

Following the mixing of the materials, the mixture is heated to a predetermined temperature in a non-oxidizing atmosphere to form a reaction product. In one aspect, the mixture is heated to a temperature above a melting temperature of the flux material. In this manner, the flux material provides a medium in which the various reactants may react to form the desired reaction product. Following the heating of the mixture the reaction product is washed, forming a carbon coated polyanion active material.

Various carbon sources may be utilized in the method. For example, the carbon source may be selected from carbohydrates, aromatic hydrocarbons, organic compounds that include carbon, hydrogen, and oxygen, as well as graphite.

Various mobile ion sources may be utilized in the method. Mobile ion sources may be selected based on the type of battery system being utilized. For example, lithium based mobile ion sources may be used for lithium batteries whereas magnesium ion sources may be utilized for magnesium batteries. In one aspect, the mobile ion source may include LiOH, LiCl, LiBr, LiI, LiNO3, Li2CO3, Li2SO4, Li3PO4, LiH2PO4, LiCOOCH3, MgO, Mg(OH)2, MgCl2, MgBr2, MgI2, Mg(NO3)2, MgCO3, MgSO4, Mg3(PO4)2, and Mg(COOCH3)2. Various other sources of mobile ions including lithium and magnesium ions may also be utilized.

The active metal material utilized in the method may be selected from transition metal compounds that include oxides, sulfates, and carbonates. Various transition metal compounds that are redox active may be utilized. For example, transition metal compounds including MnO, MnCO3, MnSO4, MnCl2, MnBr2, MnI2, Mn(COOCH3)2, FeSO4, FeCl2, FeBr2, FeI2, Fe(COOCH3)2, FeC2O4, FeC6H8O7, Fe(NO3)3, Cr2O3, Cr2(CO3)3, CrCl3, CrBr3, CrI3, V2O5, V2O3, NiO, NiCO3, NiCl2, NiBr2, NiI2, Ni(OH)2, Ni(NO3)2, Co3O4, CoCO3, CoCl2, CoBr2, CoI2, Co(OH)2 may be utilized as active materials.

The network material provides a rigid framework or network and may have the formula $XO_m^{n-}$ where X is selected from phosphorus, silicon, molybdenum, beryllium, W, Ge, and sulfur. In one aspect, the network materials may include silicon dioxide and $H_3PO_4$.

As stated above, the flux material provides a solvent or medium in which the reactants dissolve and react to form a desired reaction product. In one aspect, the flux material may include chlorides, bromides, and iodides of alkaline and alkaline earth metals and mixtures thereof providing a molten salt based synthesis method. As stated above, the method includes heating the mixture to a predetermined temperature that is higher than the melting temperature of the flux materials. For example, if potassium chloride is utilized as the flux material, the heating temperature will need to be above the melting point of 760° centigrade for potassium chloride. As stated above, the molten flux material provides a medium in which the various reactants react and allows a carbon coating to be formed on an outer surface of the reaction product providing an improved electron conductivity of a polyanion active material. In one aspect, the washed reaction product may be in the form of crystals having an average diameter of from 15 nanometers to 50 micrometers.

There is also disclosed a polyanion active material that is the in situ reaction product of a carbon source, mobile ion source, active metal material, network material, and a flux material wherein the polyanion active material includes a carbon coating formed thereon. As previously stated above, the molten salt synthesis method provides an in situ method that does not require complicated and multiple procedures. The polyanion active material may be formed of various materials depending on the application of the active material. As stated above, various mobile ion sources as well as metal materials may be utilized for different battery applications. In one aspect, a battery may include an anode, an electrolyte, and a cathode separated from the anode by the electrolyte that includes an active material that is the in situ reaction product of a carbon source, mobile ion source, active metal material, network material, and a flux material where the polyanion active material includes a carbon coating formed thereon. Various battery systems including lithium, magnesium, sodium, potassium, and calcium may be utilized. In such battery applications various mobile ions as well as redox active transition metals may be utilized.

EXAMPLES

Example 1

Raw materials for forming a carbon coated magnesium manganese silicate are described. The example details the in situ synthesis of the reaction product using a molten salt synthesis technique. Raw materials of 1.245 grams of magnesium oxide, 3.346 grams of manganese carbonate, and 1.80 grams of silicon dioxide were mixed with a flux material of 26.64 grams of potassium chloride and a carbon source of 6.606 grams of glucose. The mixture was ground in a mortar and pestle and then placed in a crucible. The chemical reactants were purchased from Aldrich Chemical Company and are analytical grade materials. The crucible containing the mixture was then heated in a non-oxidative atmosphere to 800° centigrade at a rate of 2° centigrade per minute and was kept at the 800° temperature for 6 hours. Following the heating, the crucible was cooled to room temperature by the natural dissipation of heat. The reaction product was then washed with deionized water removing potassium chloride followed by drying at 100° centigrade for 2 hours under vacuum. The morphology and composition of the product were then characterized by SEM-EDS and XRD analysis.

Referring to FIG. 1, there is shown an SEM-EDS image of the product produced by the detailed procedure in Example 1. As can be seen in the figures, the various images of the reaction product constituents are provided and indicate a reaction product of magnesium manganese silicate having a carbon coating formed thereon. In one aspect, the example describes the synthesis of 0.3 moles of $Mg_{1.03}Mn_{0.97}SiO_4/C$. As can be seen from the SEM-EDS images, the morphology of the various constituents provides particles within the range of 15 nanometers to 50 microns described above. Additionally, the XRD graph of FIG. 2 indicates a composition of a carbon coated magnesium manganese silicate of the formula described above.

The invention is not restricted to the illustrative examples described above. Examples described are not intended to limit the scope of the invention. Changes therein, other combinations of elements, and other uses will occur to those skilled in the art. The scope of the invention is described and defined by the scope of the claims.

The invention claimed is:

1. A method of forming a polyanion active material comprising:
   providing a carbon source;
   providing a mobile ion source;
   providing an active metal material;
   providing a network material;
   providing a flux material;
   mixing the carbon source, mobile ion source, active metal material, flux material and network material;
   heating the mixture to a predetermined temperature in a non-oxidizing atmosphere forming a reaction product; and
   washing the reaction product forming a carbon coated polyanion active material.

2. The method of claim 1 wherein the carbon source is selected from: carbohydrates, aromatic hydrocarbons, organic compounds including carbon, hydrogen and oxygen, and graphite.

3. The method of claim 1 wherein the mobile ion source is selected from LiOH, LiCl, LiBr, LiI, LiNO3, Li2CO3, Li2SO4, Li3PO4, LiH2PO4, LiCOOCH3, MgO, Mg(OH)2, MgCl2, MgBr2, MgI2, Mg(NO3)2, MgCO3, MgSO4, Mg3(PO4)2, and Mg(COOCH3)2.

4. The method of claim 1 wherein the active metal material is selected from transition metal compounds.

5. The method of claim 4 wherein the transition metal compounds include MnO, MnCO3, MnSO4, MnCl2, MnBr2, MnI2, Mn(COOCH3)2, FeSO4, FeCl2, FeBr2, FeI2, Fe(COOCH3)2, FeC2O4, FeC6H8O7, Fe(NO3)3, Cr2O3, Cr2(CO3)3, CrCl3, CrBr3, CrI3, V2O5, V2O3, NiO, NiCO3, NiCl2, NiBr2, NiI2, Ni(OH)2, Ni(NO3)2, Co3O4, CoCO3, CoCl2, CoBr2, CoI2, Co(OH)2.

6. The method of claim 1 wherein the network material includes $SiO_2$ and $H_3PO_4$.

7. The method of claim 1 wherein the flux material includes chlorides, bromides and iodides of alkaline and alkaline earth metals and mixtures thereof.

8. The method of claim 1 wherein the carbon coated polyanion active material is in the form of crystals having an average diameter of from 15 nanometers to 50 microns.

9. The method of claim 1 wherein the mixing step includes grinding the materials to a uniform fine mixture.

10. The method of claim 1 wherein the carbon coated polyanion active material is formed in-situ.

11. The method of claim 1 wherein the mixture is heated above a melting temperature of the flux material.

12. The method of claim 1 wherein the flux material includes KCl, the mobile ion source includes MgO, the active metal material includes $MnCO_3$, the network material includes $SiO_2$, and the carbon source includes glucose.

* * * * *